(12) United States Patent
Carlow et al.

(10) Patent No.: US 7,163,663 B2
(45) Date of Patent: Jan. 16, 2007

(54) REACTOR FOR PLASMA ASSISTED TREATMENT OF GASEOUS

(75) Inventors: John Sydney Carlow, Southampton (GB); Ka Lok Ng, Reading (GB); James Timothy Shawcross, Charlbury (GB)

(73) Assignee: Accentus PLC, Didcot (GB)

( * ) Notice: Subject to any disclaimer, the term of this patent is extended or adjusted under 35 U.S.C. 154(b) by 41 days.

(21) Appl. No.: 10/472,207

(22) PCT Filed: Mar. 15, 2002

(86) PCT No.: PCT/GB02/01229

§ 371 (c)(1),
(2), (4) Date: Sep. 22, 2003

(87) PCT Pub. No.: WO02/074435

PCT Pub. Date: Sep. 26, 2002

(65) Prior Publication Data
US 2004/0094401 A1   May 20, 2004

(30) Foreign Application Priority Data
Mar. 21, 2001   (GB)   .................................. 0107020.0

(51) Int. Cl.
*B01J 19/08*   (2006.01)

(52) U.S. Cl. .............................. 422/186.04; 422/186.29
(58) Field of Classification Search ........... 422/186.04, 422/186.29; 204/164, 165, 168, 169, 170, 204/171, 172

See application file for complete search history.

(56) References Cited

U.S. PATENT DOCUMENTS

| 4,276,066 A | 6/1981 | Bly ............................... 55/287 |
| 4,427,418 A | 1/1984 | Kogiso ........................ 55/287 |
| 4,485,622 A | 12/1984 | Takagi .......................... 60/296 |
| 4,505,107 A | 3/1985 | Yamaguchi .................... 60/303 |
| 4,871,515 A * | 10/1989 | Reichle et al. ............... 422/174 |
| 5,746,051 A | 5/1998 | Kieser ........................ 60/275 |
| 5,914,015 A * | 6/1999 | Barlow et al. ............... 204/177 |
| 6,517,786 B1 * | 2/2003 | Best et al. ............. 422/186.04 |
| 6,767,434 B1 * | 7/2004 | Imanishi et al. ............. 204/164 |

FOREIGN PATENT DOCUMENTS

| EP | 0010384 | 4/1980 |
| EP | 0112634 | 7/1984 |
| EP | 0132166 | 1/1985 |
| EP | 0244061 | 11/1987 |
| GB | 2232613 | 12/1990 |
| GB | 2274412 | 7/1994 |
| WO | 99/20373 | 4/1999 |

OTHER PUBLICATIONS

Cutler and Merkel, "A New High Temperature Ceramic Material for Diesel Particulate Filter Applications," SAE 2000-01-2844, pp. 79-87.

* cited by examiner

*Primary Examiner*—Rodney G. McDonald
(74) *Attorney, Agent, or Firm*—William H. Holt

(57) ABSTRACT

A plasma reactor (11) of the silent discharge or dielectric barrier type for treatment of a gaseous medium is provided with a layer of material (34) positioned to present a surface extending along at least part of the length of the gas flow path. Particulates or selected species are entrapped on the surface. A preferred electrode arrangement provides surface discharge in the plasma at the surface of the layer of material.

3 Claims, 4 Drawing Sheets

REACTOR FOR PLASMA ASSISTED TREATMENT OF GASEOUS

Figure 1:
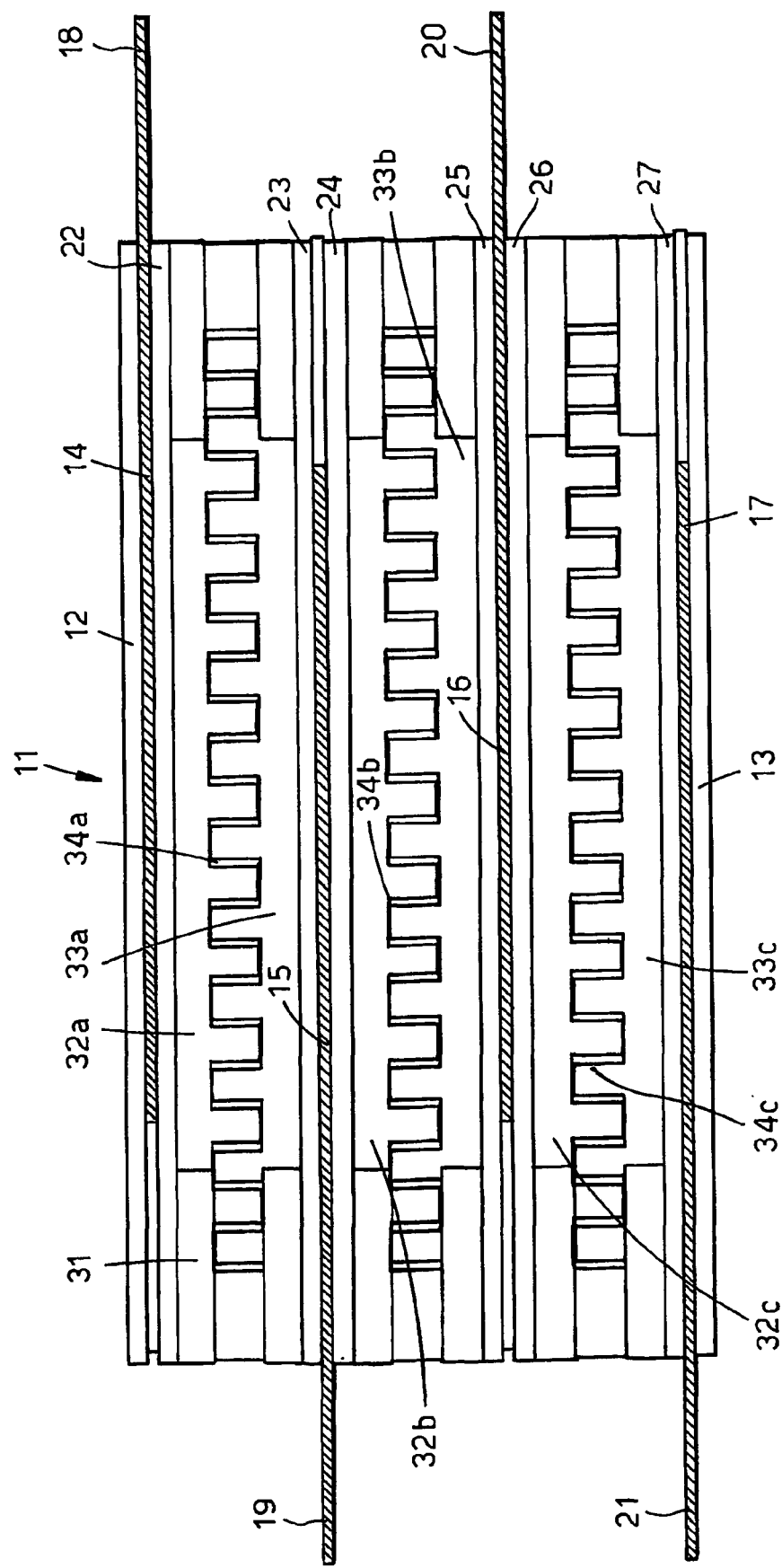

The invention relates to the plasma assisted treatment of gaseous media and more particularly to the treatment of gaseous media in which particulate material is entrained.

The invention has particular application for the plasma-assisted processing of gaseous media for the reduction of the emissions of one or more of nitrogenous oxides, particulate including carbonaceous particulate, hydrocarbons including polyaromatic hydrocarbons and soluble organic fractions, carbon monoxide and other regulated or unregulated combustion products from the exhausts of internal combustion engines.

One of the major problems associated with the development and use of internal combustion engines is the noxious exhaust emissions from such engines that can include one or more of nitrogenous oxides, particulate including carbonaceous particulate, hydrocarbons including polyaromatic hydrocarbons and soluble organic fraction, carbon monoxide and other regulated or unregulated combustion products. Increasingly severe emission control regulations are forcing internal combustion engine and vehicle manufacturers to find more efficient ways of removing these materials in particular from internal combustion engine exhaust emissions. Unfortunately, in practice, it is found that combustion modification techniques which improve the situation in relation to one of the above components of internal combustion engine exhaust emissions tend to worsen the situation in relation to the other. A variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European patent applications EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from diesel exhaust gases by a simple, physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres. A recent review by Cutler and Merkel, 'A New High Temperature Ceramic Material for Diesel Particulate Filter Applications' published in the SAE 2000 International Fall Fuels and Lubricants Meeting and Exposition as SAE 2000-01-2844 compares the use of diesel particulate filters made out of cordierite, silicon carbide and sodium zirconium phosphate. These filters are in monolithic form. Filters have been used in conjunction with additives such as the cerium oxide-based fuel additive Eolys that acts as a carbon combustion catalyst as described in WO 99/43102.

In a broader context, the precipitation of charged particulate matter by electrostatic forces also is known. However, in this case, precipitation usually takes place upon large planar electrodes or metal screens.

GB patent 2,274,412 discloses a method and apparatus for removing particulate and other pollutants from internal combustion engine exhaust gases, in which the exhaust gases are passed through a bed of charged pellets of material, preferably ferroelectric, having high dielectric constant. In addition to removing particulates by oxidation, especially electrical discharge assisted oxidation, there is disclosed the reduction of $NO_x$ gases to nitrogen, by the use of pellets adapted to catalyse the $NO_x$ reduction.

Plasma assisted gas processing reactors have also been proposed which operate in the so-called "silent discharge" mode. Such silent discharges are produced in a gas between electrodes, between which there is at least one dielectric layer or dielectric material arranged so that there is no possibility for a direct, that is metal-to-metal, discharge through the gas. Such silent discharge reactors are also referred to as dielectric barrier reactors.

A silent discharge reactor of this type is disclosed in U.S. Pat. No. 5,746,051, the reactor comprising a number of flat rectangular electrodes, as well as the same number less one of flat rectangular insulating plates interleaved between the electrodes in parallel therewith. U.S. Pat. No. 5,746,051 also identifies a number of prior art devices known for producing silent discharges.

WO 00/71866 discloses an apparatus for removing particulate and other pollutants from internal combustion engine exhaust gasses. The apparatus is also a dielectric barrier reactor for the plasma-assisted processing of a gaseous medium in which the gaseous medium is constrained to pass between the co-axial electrodes with axial, radial and circumferential gas flow component combinations which result in the gas flow being at least partially helical and/or spiral.

Such dielectric barrier reactors or other non-thermal plasma reactors including the reactors described herein can be used for applications other than vehicle applications for the treatment of combustion products from the exhausts of internal combustion engines. These other applications include reforming of hydrocarbon-based liquid or gaseous fuels or fuel processing to produce hydrogen containing streams and/or streams containing oxygenated fuels that can be used for applications including fuel cell applications in vehicles or stationary fuel cell applications, and for liquid fuel production by reforming gases such as methane.

In referring to applications for reforming liquid hydrocarbon fuels, it is to be understood that this refers to fuels that are liquid at normal ambient temperatures. Such fuels are converted to vapour form in the process for their treatment in a non-thermal plasma reactor. Further applications for which a non-thermal plasma reactor can be used are conversion of nitrogen oxides including nitric oxide to nitric acid so that the acid solution can be used in the preparation and purification of inorganic oxides, in particular uranium oxides.

A problem which arises with plasma assisted gas processing reactors which include a bed of pellets of a high-dielectric constant material, such as those exemplified in specification GB 2 274 412, is that localised variations in the electric field in the pellet bed can occur, possibly leading to regions of the pellet bed in which the electric field is insufficient to enable a plasma to be established in a gaseous medium flowing through the pellet bed of the reactor.

Reactors of the silent discharge type (such as disclosed in U.S. Pat. No. 5,746,051) having an array of alternate polarity parallel plate electrodes with intervening dielectric barriers are advantageous in providing efficient plasma generation in the spaces between plates/barriers. However, a problem with this type of reactor is that, where the gas contains particulate matter, such as soot, the residence time of the gas in a reactor of practical proportions is insufficient for plasma assisted oxidation of the particulate matter to be completed. It is therefore necessary to trap the particulate material, which can be done by introducing a packed bed of pellets into the gas flow space, the packed bed acting as a filter on which particulate matter is trapped. However, one then faces again the problem mentioned above of regions within the packed bed in which the electric field is insufficient to enable a plasma to be established in a gaseous medium as it flows through that region. Also deposition tends to be concentrated at the gas inlet region.

It is an object of the present invention to provide an improved reactor for the plasma assisted processing of gaseous media.

According to the invention there is provided a reactor of the silent discharge or dielectric barrier type for plasma assisted treatment of a gaseous medium, which reactor comprises at least one pair of electrodes between which is an intervening dielectric barrier layer defining between at least one of the electrodes and the dielectric barrier layer at least one gas flow path through which gaseous medium may pass, such that, in use, a plasma discharge is generated in the gaseous medium by application of an appropriate electrical potential across the or each electrode pair, a layer of material between the electrodes, which layer may comprise the said dielectric barrier layer or may be separate therefrom, and which provides a surface over which the gaseous medium flows, the surface extending along at least part of the length of the said gas flow path, and means for causing entrapment on the said surface of selected species or particulate matter in the gaseous medium.

In one arrangement according to the invention, the said means for causing entrapment comprises a source of direct, alternating or pulsed voltage applied so as to electrostatically trap on the said surface particulate matter in the gaseous medium. For electrostatic trapping in this way, it may be necessary to pre-charge the particulate matter by exposing the gaseous medium carrying the particulate matter to an electric field.

Preferably the said layer of material is provided by permeable filter material in sheet form and the said gas flow path is such that the gaseous medium is directed to flow through the sheet form filter material, whereby selected species or particulate material in the gaseous medium is entrapped on the surface thereof. One or both sides of the said layer of material may be provided with a coating. The coating may be such as will act as a catalyst for the removal of nitrogenous oxides or for the removal of carbonaceous material. Alternatively the catalyst on one surface may catalyse one reaction (such as reduction of nitrogenous oxides) and the catalyst on the other surface may catalyse a different reaction (such as oxidation of carbonaceous material). Or the coating or coatings may contain a mixture of catalysts.

When using the reactor, an electrical power supply is connected to apply a high voltage alternating or pulsed or direct current electrical potential or combination of these potentials to the electrodes so as to generate a plasma in a gaseous medium between the electrodes and such as to act upon the said surface, thereby to assist in the oxidation of particulate matter entrapped thereon or the promotion of reactions including catalytic reactions involving entrapped selected species. Catalytic materials may be present in the plasma region to aid in the removal of nitrogenous oxides and carbonaceous material. For alternating potentials, triangular waves, sine waves, square wave, saw-tooth wave of the same or similar characteristics can be used separately or in combination.

According to a preferred feature of the invention, the electrodes are so arranged as to promote surface discharge to take place along the said surface on which particulate matter or selected species is entrapped. Such surface discharge can be arranged to provide substantially uniform plasma treatment of particulate matter or selected species trapped on the surface. A bulk or volume plasma discharge can also be present in addition to the surface discharge.

For the promotion of surface discharge, in a preferred arrangement according to the invention, an array of discrete electrodes is positioned close to the said surface, each discrete electrode being electrically insulated from neighbouring electrodes, whereby application across each successive pair of the said discrete electrodes of a high voltage alternating or pulsed or direct electrical potential to generate plasma in gaseous medium adjacent the said surface causes surface discharge across the said surface between the electrode pairs. In this way the electrical power in the plasma is applied to the surface where the particulate material or selected species is trapped so that the surface discharge enhances reactions thereof and/or the catalytic action of the surfaces for treating the gaseous media.

Preferably, the gas flow path extends over and through the full extent of the surface acted upon by the said array of electrodes and a further continuous electrode is positioned spaced apart from the surface on the side thereof remote from the said array of electrodes, so that the said gas flow path passes between the said continuous electrode and the said surface, the said continuous electrode in use being held at ground or at a fixed potential relative to ground, and the pulsed or alternating or direct current potential applied across the neighbouring pairs of the electrodes in the array being respectively above and below that of the continuous electrode, whereby, in addition to surface discharge across the said surface between adjacent pairs of electrodes in the array there is a volume plasma discharge between the said continuous electrode and the said array of electrodes.

According to one aspect of the invention a high electric field in the surface region of the filter material extends into the boundary layer region of the gas flow, a region where the gas flow is pseudo-laminar.

To provide for efficient treatment of a large gas flow volume, a stacked arrangement of components provides a plurality of gas flow paths in parallel, each component in the stacked arrangement comprising a gas flow path defined between a said continuous electrode, a said surface and a said array of discrete electrodes positioned close to the said surface, the gas flow path extending over and through the full extent of the surface acted upon by the said array of discrete electrodes.

Preferably the or each dielectric barrier layer is in intimate contact with an electrode. By intimate contact we mean that the dielectric layer is either chemically bonded to the, usually metal, electrode or that the dielectric layer is in physical contact with the electrode. This intimate contact reduces any losses due to discharges or corona in any gaps between the electrode and barrier. This means that the power applied to the reactor is more efficiently coupled for generating a plasma discharge for processing of the gaseous media. Reducing these losses increases the efficiency of the dielectric barrier reactor and power supply system for a vehicle application and so reduces the power requirement and possible fuel penalty which are key considerations for any design. Reducing such losses also helps minimise electromagnetic emissions improving electromagnetic compatibility for vehicle applications. The physical contact between the electrode and dielectric material may be enhanced by depositing a metallised layer as a coating onto the dielectric material. The layer can be deposited electrolytically or by screen printing and can be made of, but is not restricted to, a suitable conducting material such as silver, nickel or copper. The metallised layer can also constitute the electrode. By way of an example an intermediate layer of molybdenum/manganese can first be deposited on the dielectric material and fired on at around 1400° C. causing some of the metal to diffuse into the dielectric material surface. A conducting layer, for example nickel is then deposited onto the molybdenum/manganese so that the nickel makes a uniform contact with the diffused metal layer on the dielectric material. In this way a strong, intimately bonded, metallised layer on the dielectric material is achieved between the nickel-metal electrode and the dielectric material. We have also found that enhanced formation of discharge streamers into the gas flow path and emanating from dielectric surfaces is achieved by providing on those surfaces exposed to gas an isolated discontinuous metallic film, preferably less than 10 µm in thickness and not connected to an external source of electric potential. The discontinuous metallic film may be in the form of spots or dots of metal and can be present on one or more of the dielectric barriers. The metal provides a richer source of electrons than the dielectric material and has the effect of increasing the number of discharge points emanating from one or more of the barriers and thereby increasing the efficiency of treatment of exhaust gases.

In a reactor configuration in which the said layer of material is provided by permeable filter material in sheet form and the said gas flow path is such that the gaseous medium is directed to flow through the sheet form filter material, the gas flow path on the downstream side of the layer of filter material may be packed with a gas permeable bed of an active material. The permeable filter material in sheet form may be the active material that may be selected to act as a catalyst with respect to the treatment of the gaseous medium that passes through the reactor. Further, the material of the said layer of filter material may be selected to act as a catalyst, or a catalytic material may be coated, or otherwise incorporated, on or in the layer of filter material. The material of the layer or coating may be selected to be catalytic to increase the efficiency of oxidation of particulates and/or the reduction of nitrogenous oxides to nitrogen present in the exhaust from internal combustion engines. However, a preferred arrangement is for the layer of filter material to be such as to catalyse the oxidation of particulates trapped thereon and for the gas flow path downstream of the layer of filter material to be packed with material which catalyses the reduction of nitrogenous oxides to nitrogen. The layer of filter material may also be catalytic for the reduction of nitrogen oxides. In addition components of the reactor such as the dielectric barrier layer material can be coated, partially or fully with a material or materials or combinations of materials to act as a catalyst for removal of nitrogenous oxides and carbonaceous material.

It should be appreciated that a packing material, layer material or coating that is not catalytic for the oxidation of carbonaceous particulate or reduction of nitrogenous oxides, for example by thermal mechanisms, may develop catalytic properties for these processes when exposed to a plasma. This may be due, for example to activation by oxygen atoms or other plasma-generated free radicals or activation by plasma generated species such as activated hydrocarbons as described in WO 99/12638, organo-nitrogen or activated organo-nitrogen species and or nitrogen dioxide. Catalytic or non-catalytic material properties can be further augmented by the electric field or by other charged species present in or adjacent to the plasma region.

The gas permeable bed of active packing material, can be in the form of spheres, pellets, extrudates, fibres which can be in the form of a mat, felt or blanket or vacuum formed shape or a shape made from a continuously-wound fibre, sheets, wafers, frits, meshes, coils, foams, membrane, ceramic honeycomb monolith or granules or as a coating on any of the above shapes or contained within a dielectric, polymeric or metallic material in any of the above shapes or as a combination of more than one of the aforementioned forms of packing material. When the gas permeable bed of active packing material is fabricated from fibres, the latter can be sintered together for example when in the form of a mat in order to limit the release of loose fibres from the packing material into the exhaust gases.

Examples of oxidation catalysts such as carbon combustion catalysts for use in the layer of filter material are alkali-metal salts such as lithium nitrate described in GB 2 232 613 B, cerium oxide, alkali-metal doped lanthanum oxide-vanadium oxide such as lanthanum-caesium-vanadium pentoxide in addition to the active materials, alkali metal metavanadates, alkali metal pyrovanadates, perovskites including layered perovskites and combinations of these materials. Some of these combustion catalysts such as perovskites can simultaneously remove both nitrogen oxides and carbonaceous particulates. Examples of perovskites are $La_2CuO_4$, $La_{1.9}K_{0.1}Cu_{0.95}V_{0.05}O_4$, $La_{0.9}K_{0.1}CoO_3$, $La_{0.6}Cs_{0.4}CoO_3$ and $La_{0.8}Sr_{0.2}Mn_{0.5}Cu_{0.5}O_3$. The mode of operation of such catalysts is described in specification WO 00/43102. The use of a carbon combustion catalyst can reduce the power requirements to the plasma reactor for treating carbonaceous particulate material and reduce the volume of active material required. Other examples of oxidation catalysts are manganese oxide doped aluminas, whose synthesis has been described, for example, in U.S. Pat. No. 5,880,059, lanthanide oxide doped tin oxide for example lanthanum oxide doped tin oxide, platinum containing molybdenum oxide and platinum containing alumina.

The exhaust may also contain a chemical additive acting as a carbon combustion catalyst that is either present initially in the fuel or added separately to the exhaust and whose function is to lower the combustion temperature and/or increase the rate of removal of carbonaceous material. Carbon combustion catalyst can be encapsulated within or bound to a fugitive additive that chemically decomposes during or shortly after fuel combustion thus releasing the additive into the fuel or exhaust.

Examples of packing material for catalysing the reduction of nitrogenous oxides are activated alumina such as gamma alumina, or alpha alumina or zirconium dioxide or titanium dioxide, silver aluminate, silver doped alumina, spinels, vanadium pentoxide, metal-doped and metal oxide-doped or exchanged inorganic oxides such as cobalt oxide-doped alumina, and metal-doped zeolites. Zeolites are particularly useful materials for the reduction of nitrogenous oxides. Examples of zeolites are those known as ZSM-5, Y, beta, mordenite all of which may contain iron, cobalt or copper with or without additional catalyst promoting cations such as cerium and lanthanum. Other examples of zeolites are alkali metal containing zeolites in particular sodium-Y zeolites that are particularly useful for treatment of nitrogenous oxides. Another zeolite especially useful for removal of nitrogenous oxides is ferrierite with silica to alumina mole ratios up to thirty and containing up to 10 percentage by weight of silver. It should be appreciated that zeolites, depending on their chemical composition, can also exhibit oxidative properties towards the gaseous and particulate processing reactions.

An additive may be required to improve the process of oxidation and/or reduction of the gaseous media constituents in combination with the layer of filter material and the packing material. For example when a nitrogen containing species such as ammonia, urea or cyanuric acid is used for nitrogenous oxide reduction, a particularly useful catalyst is vanadium pentoxide-titanium dioxide. Hydrocarbons are another suitable additive either added separately or residually derived from combustion fuel to promote processes such as selective catalytic reduction of nitrogenous oxides.

Figure 2:
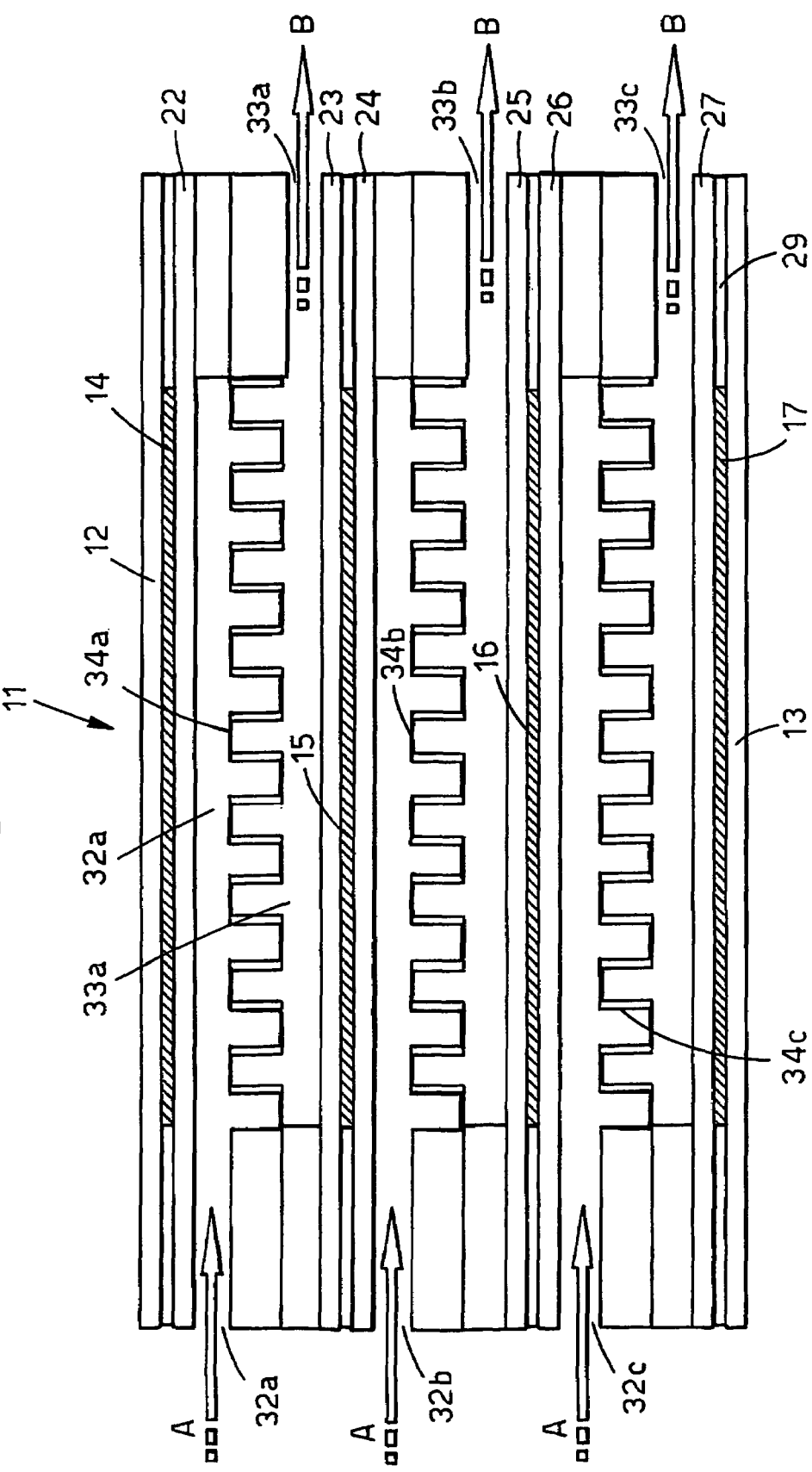
Figure 3:
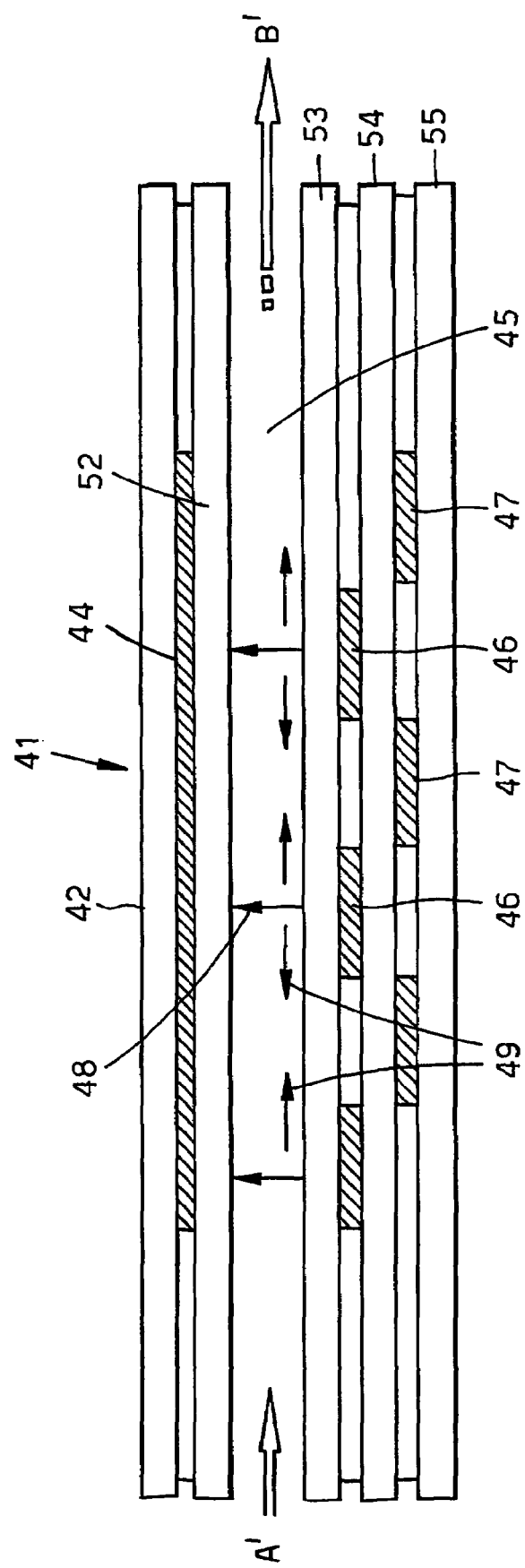
Figure 4:
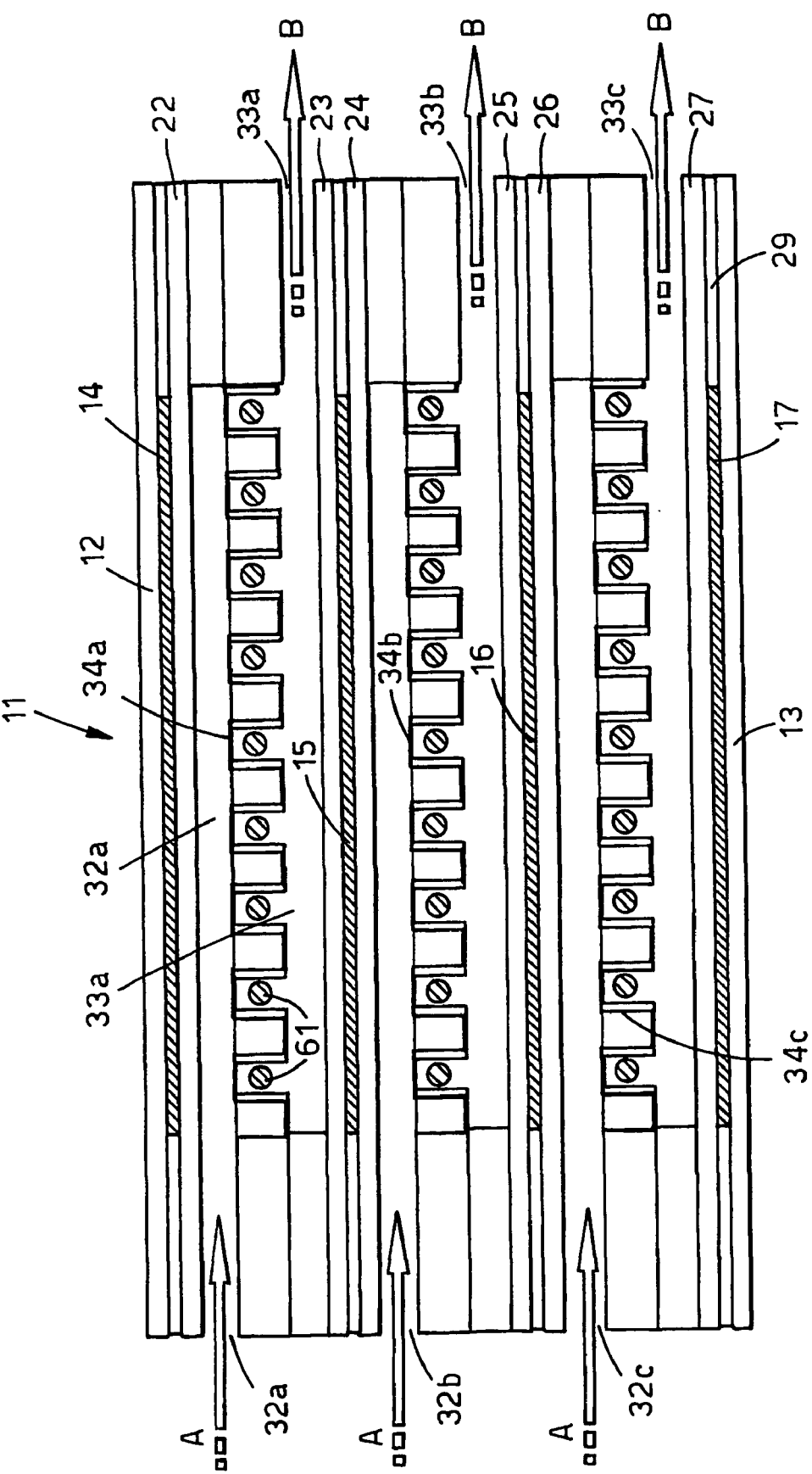

Specific constructions of reactor embodying the invention will now be described by way of example and with reference to the drawings filed herewith, in which:

FIG. 1 shows a reactor in cross-section taken transverse to the direction of incoming and out-flowing gas, FIG. 2 shows the reactor of FIG. 1 in cross-section taken parallel with the direction of incoming and out-flowing gas, FIG. 3 illustrates a modification showing a part of a reactor in cross-section taken parallel with the direction of incoming and out-flowing gas, and FIG. 4 illustrates, in a cross-sectional view corresponding to that of FIG. 2, a similar modification to the reactor of FIGS. 1 and 2.

Referring to FIGS. 1 and 2, the reactor 11 comprises a rectangular box enclosure formed between a ceramic cover plate 12 and a ceramic base plate 13. In this example, there are four electrode plates 14, 15, 16, and 17, each having an extension to provide an electrical contact, those, 18, 20, from electrode plates 14, 16 being on one side of the reactor 11, whilst the electrical contacts 19, 21 from the electrode plates 15, 17 are on the other side of the reactor 11.

Each electrode plate 14, 15, 16, 17 is secured with adhesive between respective pairs of ceramic plates 12, 22; 23, 24; 25, 26; and 27, 13. Where the electrode plates finish short of the edges of the ceramic plates, the space between respective ceramic plates is filled with ceramic adhesive, as for example referenced at 29 (FIG. 2). The ceramic plates serve as dielectric barrier layers for their associated electrode plates. Alumina is a suitable material for the ceramic dielectric barrier material. Aluminium nitride can also be used. However, as an alternative, a glass-ceramic may be used or a micaceous glass such as MICATHERM as described in publication WO 99/20373. The dielectric barrier material can be a catalytic material, or contain a catalytic coating in or on its surface. The catalytic material can be produced by ion-exchange, doping, deposited by wet chemical techniques such as sol-gel processing, incipient wetness, by sputtering or by chemical vapour deposition or by thermal spraying for example by plasma spraying or by physical and chemical vapour deposition. The type of dielectric barrier material or coating, be it catalytic or non-catalytic can be selected from those described for the packing material.

Ceramic spacers, one of which is referenced at 31, serve to hold the electrode plates spaced apart and also to form side walls of the rectangular box enclosure. At each end of the reactor 11, openings are provided at 32a, 32b and 32c for gas flow into the reactor (as illustrated by the arrows A in FIG. 2), and at 33a, 33b, 33c for gas flow out of the reactor (as illustrated by the arrows B in FIG. 2).

The ceramic spacers (such as 31) are arranged also to support, in each of the three spaces between the four electrode plates, a layer of material 34a, 34b, and 34c, each of which, in this example, is a sheet of gas permeable filter material providing a surface which extends along the length of the respective gas flow path (32a, 32b and 32c). This permeable filter may be in the form of different shapes in order to optimise the trapping of particulate material. It can have indentations with a square wave-form as shown in FIGS. 1 and 2 but other shapes such as mesh form, or indentations with a triangular form can be used.

In operation, the reactor 11 is connected to the source of gaseous medium to be treated (for example the exhaust gases of a motor vehicle) so that the gaseous medium flows into the reactor through the openings 32a, 32b, 32c in the direction of the arrows A in FIG. 2. The gaseous medium is then forced to flow through the layers of filter material 34a, 34b, 34c, in order to exit from the reactor 11 via the openings 33a, 33b, 33c.

Particulates entrained in the gas flow are trapped on the layers of filter material and are oxidised by the plasma. The filter material may alternatively or additionally be such as to trap selected species from the gaseous medium.

An electrical power supply (not shown) is connected to apply between the pair of electrode plates 15, 17 and the pair of electrode plates 14, 16 a pulsed or alternating potential or direct current of the order of hundreds of volts, kilovolts to tens of kilovolts and (in the case of pulsed or alternating potential) repetition frequencies in the range 50 Hz to 50 kHz. It is possible to make the discharge gaps narrow for this embodiment of the invention, that is of the order of 0.5 to 5 millimetres, the dimension transverse to the gap dimension being of the order of 10 to 200 millimetres. A significant advantage follows from the small gap dimension in that the applied voltage required to generate a plasma discharge is reduced and may typically be of the order of 5 kilovolts or less applied across each gas flow path. The plasma, together with any catalytic material incorporated in or on the layer of filter material, acts to oxidise particulate trapped on the filter material. The reactor 11 can operate above or below atmospheric pressure and from −40° C. to 400° C. and is thus able to operate at temperatures representative of those found in diesel exhausts from internal combustion engines.

FIG. 3 illustrates a single channel of a modified form of reactor 41. Ceramic cover plate 42, upper electrode plate 44, and ceramic dielectric barrier layer 52 are similar to the corresponding components in the example of FIGS. 1 and 2. The opposed electrode structure defining the opposite side of gas flow path 45, however, consists of three ceramic dielectric barrier layers 53, 54, 55 between which are sandwiched two electrode grid structures, spaced from one another by the dielectric layer 54. As shown in FIG. 3, the small plate like components 46 of the upper (as seen in the FIG. 3) electrode grid structure are laterally displaced with respect to the corresponding small plate like components 47 of the lower electrode grid structure. The thickness of the various components is exaggerated in all figures including FIG. 3, the dielectric barrier layers 52, 53, 54, 55 being of the order of 0.1–5 millimetre thick, preferably 1 mm thick.

In this example, electrode plate 44 is held at a fixed potential, most conveniently ground potential, while the electrode grid structures 46 and 47 are connected to a source of alternating or pulsed or direct potential with respect to the electrode plate 44 such that the potentials applied to the electrode grid structures 46 and 47 are of opposite polarity. The effect of this is to create, in addition to a volume discharge across the gap represented by the gas flow path 45, a surface discharge along the surface of the dielectric layer 53. The volume discharge is indicated by arrows such as 48 and the surface discharge is indicated by the arrows 49 and is a consequence of the electric fields set up by the difference in potential between the electrode grid structure 46 and the electrode grid structure 47.

The principal feature of this arrangement is the generation of a surface discharge on the dielectric layer 53, since this surface discharge is particularly effective for assisting the oxidation of particulates trapped on the surface. In order to cause particulates in a gaseous medium flowing through the path 45 to be trapped on the surface of the dielectric barrier layer 53, a direct voltage between the electrode plate 44 and the electrode grid structures 46 and 47 together is superimposed in addition to the alternating or pulsed potentials applied separately to the electrode grid structure 46 and electrode grid structure 47. This superimposed additional direct voltage is chosen so as electrostatically to charge particulates and thereby encourage their precipitation on the surface of the dielectric layer 53. The geometry of the surface in the region of the surface discharge can be arranged to trap particulate by direct impingement, for example by serrating the surface between the buried electrode structures.

FIG. 4 illustrates how this principle may be applied to a reactor configuration similar to that shown in FIGS. 1 and 2. In FIG. 4, components corresponding to those shown in the example of FIGS. 1 and 2 are referenced with the same reference numerals.

In the example shown in FIG. 4, the volume plasma discharge is set-up between electrode plates 14 and 15, between the electrode plates 15 and 16, and between electrode plates 16 and 17 in the same way as in the example of FIGS. 1 and 2. The differences are that the layers of filter material 34a, 34b, 34c have the form of a continuous sheet on one side with upstanding, square-section, ribs on the other. Extending between and along the length of the ribs is an array of insulated metal rod electrodes 61 connected so that adjacent rod electrodes 61 have opposite polarity electric potential applied to them. These rod electrodes 61 serve to provide a surface discharge on the surfaces of the layers of filter material 34a, 34b, 34c.

The invention is not restricted to the details of the foregoing examples. For instance, the layers of filter material 34a, 34b, 34c need not necessarily have the particular form shown, but may comprise any suitable layer of gas permeable material providing a surface on which particulate matter is trapped as gaseous medium passes therethrough. For example, a slice of permeable monolithic foam may be used.

Some or all of the dielectric barrier layers 22–27 may be apertured to provide an array of so-called triple junctions between the metal electrode, dielectric material and gas which are effective to decrease plasma ignition voltage. The work function of the metal is reduced at the point of contact between the metal, insulator and air, the triple junction, due to penetration of the electric field into the insulator (the dielectric material) but not the metal. Electron tunnelling occurs from the metal to the conduction band of the insulator and electrons can be emitted from both the metal and the insulator. Electrical discharge takes place at lower voltage in the composite electrode so that higher plasma currents (plasma energy per litre of plasma) can be obtained. This triple effect increases the number of discharges per unit length of reactor. A similar effect may be achieved with the configuration shown in the example of FIG. 4 by inverting the layers of filter material 34a, 34b, 34c together with their associated rod electrodes 61, and arranging for the volume discharge electric potential to be applied between the array of rod electrodes 61 and the electrode plate (14, 15,16) now facing the side of the layer of filter material (34a, 34b, 34c respectively) in which the slots containing the electrode rods 61 are open, thus providing an array of effective triple junctions between the filter material (which has, for this purpose, to be of suitable dielectric material), the rod electrodes 61 and the incoming gaseous medium.

Application of a magnetic field, or magnetic fields, to encourage spiral motion of electrons and ions in the gas plasma formed in the gas flow paths further improves the effectiveness of the plasma and efficiency of the reactor. This is because of the longer path followed by the discharge between electrodes as a result of the spiralling motion of electrons and ions.

As mentioned above, enhanced formation of discharge streamers into the gas flow path and emanating from dielectric surfaces is achieved by providing on those surfaces exposed to gas an isolated discontinuous metallic film, preferably less than 10 μm in thickness and not connected to an external source of electric potential. The discontinuous metallic film may be in the form of spots or dots (of any circumferential shape, such as circular, rectangular or irregular, even fractal) of metal and can be present on one or more of the dielectric barriers. Such added metallic sources of discharge points can also be provided on or in dielectric packing material, where this is also provided in the gas flow path between the electrode. Thus, for example dielectric packing material in the form of spheres or other shapes may be provided with surface deposits of thin film metal dots or spots. Alternatively, the packing itself may contain a distribution of metallic spheres (or other shapes) in amongst the dielectric packing. Such surface metal dots or spots are also advantageous on a dielectric surface for which provision has been made for promoting surface discharge, such as the surface of dielectric layer 53 in FIG. 3 or the surfaces of the filter material 34a, 34b, 34c of FIG. 4. However, it will be appreciated that the location and dimensions of the metal dots or spots must be such that there is not formed a metallic path which would effectively short out the surface discharge path between the electrodes, such as 46, 47 in FIG. 3 or adjacent rods 61 in FIG. 4.

The reactor embodiments described may be installed as part of an emissions control system employing catalysts or other emission control devices for the plasma assisted treatment of the exhaust gases from internal combustion engines. These other emission control devices may comprise exhaust gas recirculation (EGR), variations in ignition timing, fuel ignition timing and fuel injection pulse rate shaping.

The invention claimed is:

1. A silent discharge or dielectric barrier reactor for plasma assisted treatment of a gaseous medium, which reactor comprises at least one pair of electrodes between which is an intervening dielectric barrier layer defining between at least one of the electrodes and the dielectric barrier layer at least one gas flow path through which gaseous medium may pass, such that, in use, a plasma discharge is generated in the gaseous medium by application of an appropriate electrical potential across the or each electrode pair, a layer of material between the electrodes, which layer may comprise said dielectric barrier layer or may be separate therefrom, and which provides a surface over which the gaseous medium flows, means for causing entrapment on said surface of selected species or particulate matter in the gaseous medium, and said surface extends along at least part of the length of said gas flow path characterised in that the electrodes are so arranged as to promote surface discharge to take place along said surface on which the selected species or particulate matter is entrapped and an array of discrete electrodes is positioned close to said surface in pairs, each discrete electrode being electrically insulated by a dielectric barrier from neighbouring electrodes, whereby application across each successive pair of said discrete electrodes of a high voltage alternating or pulsed or direct electrical potential for generating plasma in gaseous medium adjacent said surface causes surface discharge across said surface between the electrode pairs.

2. A reactor as claimed in claim 1, further characterised in that the gas flow path extends over and through the full extent of the surface acted upon by said array of electrodes and a further continuous electrode is positioned spaced apart from the surface on the side thereof remote from said array of electrodes, so that said gas flow path passes between said continuous electrode and said surface, said continuous electrode in use being held at ground or at a fixed potential relative to ground, and the pulsed or alternating or direct potential applied across neighboring pairs of the electrodes in the array being respectively above and below that of the continuous electrode, whereby, in addition to surface discharge across said surface between neighboring pairs of electrodes in the array there is a volume plasma discharge between said continuous electrode and said array of electrodes.

3. A reactor as claimed in claim 2, further characterised in that a stacked arrangement of components provides a plurality of gas flow paths in parallel, each component in the stacked arrangement comprising a gas flow path defined between a said continuous electrode, a said surface and a said array of discrete electrodes positioned close to said surface, the gas flow path extending over and through the full extent of the surface acted upon by said array of discrete electrodes.

* * * * *

UNITED STATES PATENT AND TRADEMARK OFFICE
CERTIFICATE OF CORRECTION

| | | |
|---|---|---|
| PATENT NO. | : 7,163,663 B2 | Page 1 of 1 |
| APPLICATION NO. | : 10/472207 | |
| DATED | : January 16, 2007 | |
| INVENTOR(S) | : John Sydney Carlow, Ka Lok Ng and James Timothy Shawcross | |

It is certified that error appears in the above-identified patent and that said Letters Patent is hereby corrected as shown below:

On the Title page of the patent, the title, at (54), is corrected to --REACTOR FOR PLASMA ASSISTED TREATMENT OF GASEOUS MEDIA--;

At column 1, lines 1 and 2, the title is corrected to --REACTOR FOR PLASMA ASSISTED TREATMENT OF GASEOUS MEDIA--.

Signed and Sealed this

Twenty-seventh Day of March, 2007

JON W. DUDAS
*Director of the United States Patent and Trademark Office*